(12) United States Patent
Topsøe et al.

(10) Patent No.: US 6,241,960 B1
(45) Date of Patent: Jun. 5, 2001

(54) METHOD FOR PREPARATION OF SMALL ZEOTYPE CRYSTALS

(75) Inventors: Haldor F. A. Topsøe, Vedbæk; Claus J. H. Jacobsen, Jægerspris; Michael Brorson, Charlottenlund; Claus Madsen; Iver Schmidt, both of Copenhagen, all of (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/437,923

(22) Filed: Nov. 10, 1999

(30) Foreign Application Priority Data

Nov. 18, 1998 (DK) .............................. 1998 01505

(51) Int. Cl.$^7$ .......................... C01B 39/02; C01B 37/04; C01B 37/06; C01B 37/08; B01J 27/18
(52) U.S. Cl. .......................... 423/700; 423/705; 423/706; 423/716; 423/305; 423/306; 423/326; 423/328.2; 423/DIG. 22; 423/DIG. 24; 423/DIG. 32; 502/60; 502/64; 502/77; 502/208; 502/214
(58) Field of Search .................................. 423/700, 705, 423/707, 716, 305, 306, 326, 328.2, DIG. 27, DIG. 24, DIG. 22, DIG. 32; 502/60, 63, 64, 77, 208, 214

(56) References Cited

U.S. PATENT DOCUMENTS

| 3,329,627 | * | 7/1967 | Gladrow et al. ...................... 423/716 |
| 4,557,858 | * | 12/1985 | Galloway ............................. 423/700 |
| 4,567,152 | * | 1/1986 | Pine ........................................ 502/64 |
| 4,681,864 | * | 7/1987 | Edwards et al. ...................... 502/63 |
| 4,977,122 | * | 12/1990 | Eberly .................................... 502/69 |
| 6,004,527 | * | 12/1999 | Murrell et al. ........................ 423/712 |

FOREIGN PATENT DOCUMENTS 323 893 * 7/1989 (EP) .

OTHER PUBLICATIONS

Castagnola et al., "Nanometer–Sized Zeolite X Crystals: Use as Photochemical Hosts," J. Phys. Chem. B, vol. 102, No. 10, pp. 1696–1702, 1998.*

M. Yamamura et al., "Synthesis of ZSM–5 Zeolite with Small Crystal Size and its Catalytic Performance for Ethylene Oligomerization", Zeolites, vol. 14, Nov./Dec. 1994, pp. 643–649.

M.A. Camblor et al., "Synthesis of Nanocrystalline Zeolite Beta in the Absence of Alkali Metal Cations", Studies in Surface Science and Catalysis, vol. 15, 1997, pp. 341–348 (No Month).

K. Beschmann et al., "Isomerization of Xylene and Methylation of Toluene on Zeolite H–ZSM–5, Compound Kinetics and Selectivity", Journal of Catalysis, 1993, pp. 548–565 (No Month).

N.Y. Chen et al., "Some Catalytic Properties of ZSM–5, A New Shape Selective Zeolite", Journal of Catalysis, 1978, pp. 453–458 (No Month).

S. Pu and T. Inui, "Influence of Crystallite Size on Catalytic Performance of HZSM–5 Prepared by Different Methods in 2,7–dimethylnaphthalene Isomerization", Zeolites, vol. 17, pp. 334–339, 1996 (No Month).

* cited by examiner

Primary Examiner—David R Sample
(74) Attorney, Agent, or Firm—Ostrolenk, Faber, Gerb & Soffen, LLP

(57) ABSTRACT

A method for the preparation of small zeotype crystals with controlled sizes comprising the steps of synthesizing inside a porous material having a majority of pores less than 1000 Å a synthesis gel consisting essentially of (a) a zeotype precursor composition comprising hydratized oxides of Si, Al and P and metal compounds
(b) a zeolite template; and
heating or autoclaving the porous support material containing synthesis gel, whereby zeotype crystals are formed; and
rinsing and drying the porous support material containing zeotype crystals.

12 Claims, No Drawings

METHOD FOR PREPARATION OF SMALL ZEOTYPE CRYSTALS

The present invention is directed to the preparation and isolation of small zeotype crystals.

In particular, the invention concerns a novel method by which it is possible to achieve well defined sizes of zeotype crystals for example useful in the preparation of catalysts.

Zeotype is defined as the collective name of zeolites and related compounds, where Si is partly or completely substituted by Al and/or P and/or metals. Zeolites are zeotypes with a low degree of Si substitution.

Small zeotype crystals are interesting for a variety of catalytic reactions and many attempts to minimize the crystal size have been reported.

Castagnola et al. use low-temperature ageing in the presence of sucrose in order to synthesize 2500 Å aggregates of individual 130 Å crystals of zeolite X (N. B. Castagnola, P. K. Dutta, J. Phys. Chem. B, 1998, 102, 1696–1702). By decreasing the Si/Al ratio and increasing the OH/Si ratio Yamamura et al. synthesise 300–500 Å ZSM-5 consisting of individual 130–200 Å crystals (M. Yamamura, K. Chaki, T. Wakatsuki, H. Okado, K. Fujimoto, Zeolites, 1994, 14, 643–649.).

Zeolite Beta was synthesised with a crystal size down to 100 Å by decreasing the Si/Al ratio in the absence of alkali metal cations are described by M. A. Camblor, A. Corma, A. Mifsud, J. Pérez-Pariente, S. Valencia, Progress in Zeolite and Microsporous Materials, Studies in Surface Science and Catalysis, 1997, 105, 341–348.

Varying the ratios of Si/Al, $H_2O$/Al and K/Al Meng and co-workers prepare 300 Å crystals of zeolite L [X. Meng, Y. Zhang, C. Meng, W. Pang, The proceedings of the $9^{th}$ international zeolite conference, Montreal 1992, Eds. R. von Ballmoos et al., 297–304].

The advantages of small zeotype crystal sizes are in particular, (1) a reduction of the diffusion resistance in the zeotype (K. Beschmann, L. Riekert, J. Catal., 1993, 141, 548–565), (N. Y. Chen, W. E. Garwood, J. Catal., 1978, 52, 453–458), (S. B. Pu, T. Inui, Zeolites, 1996, 17, 334–39);

(2) a reduction of the deactivation rate of the zeotype caused by coke deposition at the external surface (M. Yamamura, K. Chaki, T. Wakatsuki, H. Okado, K. Fujimoto, Zeolites, 1994, 14, 643–649), (H. van Bekkum, E. M. Flanigen, J. C. Jansen (editors), Elsevier, Amsterdam, Vol. 58, 1991, 619).

It has now been found that by crystallizing the zeotype inside a porous support material with pores smaller than 1000 Å, the size of the zeotype crystals can be controlled. The porous support material is preferably removable in order to isolate the pure zeotype or useful as component of a desired catalyst. Examples of typical porous support materials are carbon and magnesium oxide representing the group of removable porous support materials and silica alumina, which may be a desirable constituent of the catalyst. But any other suitable material having pores smaller than 1000 Å may be applied as a support material.

The parameters, which control the zeotype crystal sizes, are the pore size of the porous support material, the concentration of the zeotype precursors in the pores of the porous support material, and the detailed conditions of crystallization.

The pore size distributions in the porous support material can be determined by the BET method and Hg intrusion. The zeotype crystal sizes can be determined by broadening of X-ray powder diffraction lines (XRPD) using the Debye-Scherrer approach and by transmission electron microscopy (TEM).

In accordance with the above finding, this invention provides a novel method for the preparation and isolation of small zeotype crystals with controlled sizes.

An advantage of the invention is that the maximum size of the zeotype crystals obtained is given by the pore diameter of the porous support material.

A further advantage of the method of the present invention is that it is applicable for the preparation of any type of zeotypes.

Still, an advantage is that the extent of agglomeration of the individual zeotype crystals is strongly reduced, when the crystallization is proceeding within the porous support material. This is useful in applications, where the porous support material is not removed from the zeotype in that the zeotype crystals are thereby excellently dispersed throughout the pore system of the porous support material.

As further an advantage, when applying removable support materials such as carbon or MgO, which are removed by pyrolysis and acid hydrolysis respectively, the removal of the porous support material secures a secondary pore system in between the zeotype crystals, which facilitates the diffusion of reactants into the zeotype and reaction products out of the resulting zeotype crystals.

Thus, the prepared zeotype crystals are useful as catalyst in a number of chemical reactions, including hydrocracking and other known refinery processes.

Examples of specific embodiments of the present invention are described below.

DETAILED DESCRIPTION OF THE INVENTION

In all the examples described below, distilled water was used as the source of water. Additionally, all the synthesis gel compositions presented below are given in mole ratios of the individual components.

Generally, zeotypes are prepared by use of a primary Si/Al/P-source (precursor source), which is hydrolyzed under synthesis conditions, and a template mixture, which is depending on the zeotype to be formed, contains an organic or inorganic (alkali) template promoting the formation of the desired zeotype from the corresponding synthesis gel (hydrolyzed precursor source and template mixture). The template mixture may in addition to the zeotype promoters (template) contain compounds providing for desired elements of the resulting zeotype (secondary precursor sources), which are insoluble in the primary precursor source thus added along with the template in the template mixture. The obtained synthesis gel may contain hydrolyzed oxide compounds of Si, Al, P and metals together with the template. Zeotype crystals are obtained from the synthesis gel by heating or autoclaving the synthesis gel according to known methods. Volatile organic templates are removed from the resulting zeotype during activation.

The chemical sources used in the synthesis must be soluble in either water or an organic volatile solvent. Below are given examples of typical sources of Si, Al and P. However, any source complying with the solubility criterion may be used.

Suitable silicium sources are $M_2SiO_3$, M=Na, K or $Si(OR)_4$, where R=alkyl.

Suitable aluminium sources are $Al(NO_3)_3$, $Al_2(SO_4)_3$, $NaAlO_2$, $KAlO_2$ and $Al(OR)_3$, where R=alkyl.

Suitable phosphor sources are $H_3PO_x$, where x=2,3,4.

Useful organic templates are alkyl amines or tetraalkyl ammonium salts, tetra-alkyl ammonium bromides or hydroxides and inorganic templates are alkali metals.

EXAMPLE 1

Crystallization of ZSM-5

An example made as reference was carried out as follows. Tetra ethyl ortho silicate (TEOS) and aluminium isopropoxide (Al($^i$OPr)$_3$) was used as silica and alumina source and tetrapropyl ammonium hydroxide (TPAOH) was used as template. The synthesis mixture is based on the synthesis of ZSM-5 described in A. E. Persson, B. J. Schoeman, J. Sterte, J. E. Ottersted, Zeolites, 1994, 14, 557–567 and M. Ghamami, L. B. Sand, Zeolites, 1983, 3, 155–162.

6.58 g Al($^i$PrO)$_3$ was dissolved in a mixture of 0.200 kg TPAOH (40%, Aldrich), 0.044 kg ammonia (25%, Riedel-de Haën) and 0.220 kg water. 0.340 kg TEOS (98%, Aldrich) was added to the solution under agitation and the solution was aged for 3 hours.

A synthesis gel in the support with the following composition was obtained:

25 SiO$_2$: 6 TPAOH: 10 NH$_3$: 200 H$_2$O: 100 EtOH.

The synthesis gel was transferred to a porcelain cup, which was placed in an autoclave containing sufficient amounts of water to produce saturated steam. The autoclave was heated at 180° C. for 48 hours.

The product was washed with water until the pH value of the washing water reached 7–8.

Phase identification (XRPD) was carried out with a Philips PW 1820 Diffractometer using monochromatic CuKα radiation (40 kV and 40 Ma). The XRPD of the synthesised ZSM-5 revealed the presence of crystalline ZSM-5 with a crystal size of more than 1000 Å.

EXAMPLE 2

Crystallization of ZSM-5 in Carbon.

Carbon Black in form of Black Pearls (BP-700) and Black Pearls (BP-2000, Carbot Corp.) were used as support materials. These materials have mesopores with a narrow pore size distribution and a sufficiently high pore volume.

Two different approaches were used in the preparation of zeolites in the pore system of the support. One approach was to hydrolyse the silica-source to silica under basic conditions prior to the impregnation of the template, and the other approach was to hydrolyse the silica-source with pre-impregnated template. In all the impregnation steps, impregnation by incipient wetness was used in order to avoid crystallization outside the pore system.

EXAMPLE 2.A

Pre-hydrolysis of Silica Source, Without Aluminium.

As an example, 1.00 kg of BP-700 with a Hg-pore volume of 0.728 1/kg and a BET pore radius of 106 Å was dried in an oven at 150° C. for 3 hours.

A synthesis gel in the support with the following composition:

25 SiO$_2$: 5.2 TPAOH: 10 NH$_3$: 149 H$_2$O: 23 EtOH was obtained as described below.

A solution of 0.34 kg TEOS (98%, Aldrich) and 0.29 kg ethanol (>95%, Bie & Berntsen A/S) was impregnated in the support. The support was dried for 5 hours at room temperature impregnated with a mixture of 0.11 kg ammonia (25%, Riedel-de Haën), 0.03 kg water and 0.046 kg ethanol (>95%, Bie & Berntsen A/S) and dried at room temperature for 12 hours followed by 120° C. for 2½% hours.

A template mixture was prepared by mixing 0.17 kg tetrapropyl propyl ammonium hydroxide (40%, Aldrich) with 0.04 kg water followed by addition of 0.045 kg ammonia (25%, Riedel-de Haën) and 0.07 kg ethanol (>95%, Bie & Bernsten A/S).

The template mixture was impregnated in the support and aged at room temperature for 3 hours in a sealed water bath. After ageing, the impregnated support was transferred to a porcelain cup and placed in a stainless steel autoclave containing water. The impregnated support was then hydrothermally autoclaved at 180° C. for 48 hours under static conditions.

The autoclave was cooled to room temperature, and the product was suspended in water isolated by suction filtration, resuspended in water, and filtered again. The rinsing step was repeated four times followed by one rinsing step with ethanol. The product was dried at 110° C. for 3 hours before carrying out the powder X-ray diffraction (XRPD) analysis.

EXAMPLE 2.B

Pre-hydrolysis of Silica Source, with Aluminium.

Example 2.A was repeated, but now the template mixture was prepared by dissolving 6.6 g aluminium isopropoxide (98%, Struers) in a solution of 0.17 kg tetrapropyl ammonium hydroxide (40%, Aldrich) and 0.04 kg water followed by addition of 0.045 kg ammonia (25%, Riedel-de Haën) and 0.07 kg ethanol (>95%, Bie & Berntsen A/S).

A synthesis gel in the support of the following composition was then obtained:

25 SiO$_2$: 0.25 Al$_2$O$_3$: 5.2 TPAOH: 10 NH$_3$: 149 H$_2$O: 23 EtOH.

The same procedures in the hydrothermal autoclave step and rinse step as in Example 1 were employed.

EXAMPLE 2.C

Pre-impregnation of Template.

A similar procedure as in Example 2.B was employed, but now the impregnation of the template mixture was made prior to the impregnation of the silica-source.

The template mixture was prepared by mixing 0.19 kg tetrapropyl ammonium hydroxide (40%, Aldrich) with 0.11 kg water followed by addition of 0.04 kg ammonia (25i, Riedel-de Haën) and 0.29 kg ethanol (>95%, Bie & Bernsten A/S).

The solution was impregnated in the support and dried for 3 hours at room temperature.

After drying, the support was impregnated with 0.34 kg TEOS and aged in a sealed water bath for 3 hours.

A synthesis gel in the support of the following composition was obtained:

25 SiO$_2$: 5.8 TPAOH: 9 NH$_3$: 220 H$_2$O: 100 EtOH.

Same procedure in the hydrothermal autoclave step and rinse step as in Example 1 was employed.

EXAMPLE 2.D

Pre-impregnation of Template and Aluminium.

Example 2.C was repeated, but now 6.6 g aluminium-isopropoxide was dissolved in the template mixture.

A synthesis gel in the support of the following composition was obtained: 25 $SiO_2$: 0.25 $Al_2O_3$: 5.8 TPAOH: 9 $NH_3$: 220 $H_2O$: 100 EtOH.

Same procedure in drying, impregnation of silica-source, hydrothermal autoclave step and rinsing step as in Example 2.C were employed.

EXAMPLE 2.E

Crystallization of ZSM-5 in Large Pore Carbon.

A similar synthesis procedure was employed as in Example 2.D with a new support material BP-2000 with a Hg-pore volume of 4.01 l/kg and a BET pore radius of 228 Å.

The support material was dried in an oven at 150° C. for 3 hours before use. Example 2.D was followed using 1.00 kg of BP-2000 corresponding to a total pore volume of 4.01 l. The only difference was that the amounts of chemical components was scaled up by a factor 5.5 (4.01/0.728).

A synthesis gel in the support of the following composition was obtained:

25 $SiO_2$: 0.25 $Al_2O_3$: 5.8 TPAOH: 9 $NH_3$: 220 $H_2O$: 100 EtOH. The same procedure in drying, impregnation of silica-source, hydrothermal autoclave step and rinse step as in Example 2.C were employed.

In Table 1 crystal sizes of the synthesis Examples 2.A–2.D are shown. The crystal sizes (L) are calculated on basis of XRPD line broadening using the Scherrer equation at the (501) and (151) reflections, corresponding to 2θ at 23.18° and 23.72°, respectively.

TABLE 1

| Sample | $L_{501}$/Å | $L_{151}$/Å |
|---|---|---|
| 0 | >1000 | >1000 |
| 2.A | 365 | 777 |
| 2.B | 162 | 157 |
| 2.B* | 374 | 258 |
| 2.C | 203 | 160 |
| 2.C* | 387 | 769 |
| 2.D | 191 | 155 |
| 2.D* | 294 | 312 |
| 2.E | 482 | 452 |

Table 1 Calculated crystal size, L, calculated by the Scherrer equation at the 501 and 151 reflections, respectively, indicated by indices 501 and 151. *Porous support material removed by pyrolysis (ref. Example 2).

Additionally, transmission electron microscopy (TEM) (Philips EM430, 300 Kv) of the examples were performed. The morphology of the particles is aggregation of small ellipsoisal particles. Sizes of the examples determined by XRPD are confirmed by the TEM-pictures, which show particles with a crystal size as low as 80 Å.

BET surface area of sample B.1* was 395.1 $m^2/g$ with an external surface area of 156.3 $m^2/g$. The zeolite showed remarkable mesoporous adsorption properties. In addition to the internal pore volume of the zeolite crystals of 0.13 ml/g the sample showed pores with a narrow size distribution an average pore radius of 200 Å and a pore volume of 0.54 ml/g.

EXAMPLE 3

Removal of Porous Support Material by Pyrolysis

Removal of the carbon support was achieved by pyrolysis. The support was distributed in a thin layer in a muffle furnace, heated with a heating ramp of 2° C./min from 24° C. to 250° C. and changed to 1° C./min from 250° C. to 400° C. This high temperature was maintained for approximately 6 hours depending on the type of carbon support.

EXAMPLE 4

Crystallization of ZSM-5 in MgO.

The magnesium oxide porous support was made by calcination of magnesium hydroxy carbonate hydroxide pentahydrate (99% $(MgCO_3)_4$, $Mg(OH)_2$, $5H_2O$, Aldrich) at 700° C. for 6 hours. The BET surface area was 72 $m^2/g$, it had a mean pore radius of 119 Å and a pore volume of 0.36 ml/g.

The synthesis of ZSM-5 with Si/Al=50 were performed as Example 2.D. Carbon black (BP-700) was substituted with 2.00 kg MgO (corresponding to the same pore volume as 1.00 kg BP-700). The same procedure and weighted amounts of TEOS, TPAOH, Al($^i$PrO)$_3$, EtOH and $NH_3$ as in Example 2.D were used to synthesize ZSM-5/MgO.

The XRPD of the product showed the presence of ZSM-5 with a crystal size of approximately 190 Å.

EXAMPLE 5

Removal of MgO Porous Support by Acid

MgO porous support was removed from ZSM-5/Mgo synthesised as in Example 4 by acid hydrolysis with 2M $HNO_3$ at 80° C. for 2 hours. The ZSM-5 was filtrated, washed with water until the pH of the washing water reached 6–7, and dried at 110° C. for 3 hours. XRPD of the product showed ZSM-5 with a crystal size of 204 Å.

EXAMPLE 6

Crystallization of LTA and SOD in Silica-alumina.

Confined space synthesis of sodalite (SOD) in η-$Al_2O_3$ was performed as follows. 1 kg of 5 wt. % $SiO_2$ in η-$AL_2O_3$ (HTAS B-20, Haldor Topsøe A/S) calcined at 550° C. was impregnated with 2.5 L 2 M NaOH solution. The alumina was dried at 110° C. for 2 hours and transferred to a PTFE lined beaker within a stainless steel autoclave containing some water in order to avoid excess evaporation from the gel. The autoclave was heated at 120° C. for 18 hours. The product was washed thoroughly with water and dried at 110° C. for 3 hours followed by calcination at 550° C. for 6 hours.

The XRPD showed that the material only contained η-$Al_2O_3$ and sodalite. The crystal size of the zeolite was calculated by the Scherrer equation to 150 Å. Transmission electron microscopy showed presence of alumina and a crystalline material with some crystals as small as 40 Å, which is comparable to the crystal size of the alumina.

Linde type A (LTA) in η-$Al_2O_3$ was synthesised in a similar method. 1 kg of 5 wt % $SiO_2$ in η-$Al_2O_3$ (HTAS B-20, Haldor Topsøe A/S) calcined at 550° C. was impregnated with 2.5 L 4 M KOH solution. Same procedure in the drying step, hydrothermal autoclave step, rinse step and calcination as described above was employed.

XRPD of the product showed the presence of η-$Al_2O_3$ and zeolite. The zeolite was determined as LTA with a crystal size of 183 Å calculated by the Scherrer equation.

EXAMPLE 7

Crystallization of SOD in $MgAl_2O_4$.

Magnesium aluminium spinel ($MgAl_2O_4$, in form of a catalyst carrier calcined at 750° C., under the tradename 'R67', as supplied by Haldor Topsøe A/S) with a pore volume of 0.50 ml/g and a BET pore radius of 102 Å was used as support material.

1.00 kg of MgAl$_2$O$_4$ was immersed in a solution of 1.00 kg TEOS and 0.86 kg EtOH (corresponding to 50 vol. % EtOH) for 1 hour. The impregnated MgAl$_2$O$_4$ was dried at room temperature until ethanol had evaporated.

3.20 kg NaOH (97%, Aldrich) and 0.95 kg sodium aluminate (NaAl$_2$O$_3$, 54 wt. % Al$_2$O$_3$ and 41 wt. % Na$_2$O) was dissolved in 1.00 kg of water. The impregnated MgAl$_2$O$_4$ was immersed in the solution for 1 hour, dried roughly with a towel and aged for 2 hours. A synthesis gel of the following composition was obtained:

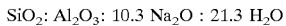

$$SiO_2: Al_2O_3: 10.3\ Na_2O : 21.3\ H_2O$$

Afterwards it was transferred to a porcelain cup, placed in a stainless steel autoclave containing some water and hydrothermal autoclaved at 140° C. for 24 hours under static conditions.

The product was washed with water until the pH of the washing water reached 7–8, dried at 110° C. for 3 hours and calcined at 550° C. for 6 hours.

The XRPD of the product showed that the phases were MgAl$_2$O$_4$ with spinel structure and zeolite with sodalite structure. The crystal size of the zeolite was calculated by the Scherrer equation to 83 Å.

The Examples above cover solely the preparation of zeolitic zeotypes, but the technique applied according to the present invention may be used for any other zeotype.

What is claimed is:

1. A method for the preparation of zeotype crystals comprising:

(a) heating or autoclaving a porous support material containing a synthesis gel under conditions sufficient to form said zeotype crystals within the pores of said porous material, (b) rinsing and drying the porous support material containing zeotype crystals;

wherein the porous support material has a majority of pores which are less than 1000 Å, and the synthesis gel is formed from:

a precursor composition comprising one or more zeotype precursor sources of Si, Al, P or metals; and
   a zeolite template.

2. The method of claim 1, wherein the synthesis gel is formed inside the porous support material.

3. The method of claim 2, wherein the porous support material initially contains one or more of the zeotype precursor sources, and the synthesis gel is formed by contacting said support material containing one or more zeotype precursor sources with said zeolite template and at least one additional zeotype precursor source.

4. The method of claim 2, wherein the synthesis gel is obtained by contacting the porous support material with each of the zeotype precursor sources and a template mixture one at a time in succession in any order, said template mixture containing said zeolite template and, optionally, at least one of said zeotype precursor sources.

5. The method of claim 2, wherein the zeotype precursor source of Si is selected from the group consisting of inorganic silicates and organic silicon alkylates.

6. The method of claim 2, wherein the zeotype precursor source of Al is selected from the group consisting of inorganic aluminum oxides and organic aluminum alkylates.

7. The method of claim 2, wherein the zeotype precursor source of P is a compound having the formula H$_3$PO$_x$, where x is 2, 3 or 4.

8. The method of claim 2, wherein the zeotype precursor source of metal is a metal salt.

9. The method of claim 2, wherein the precursor sources are soluble in water and/or an organic solvent.

10. The method of claim 2, wherein the zeolite template is selected from the group consisting of alkyl amines, tetra-alkyl ammonium salts, tetra-alkyl amino bromides, tetra-alkyl amino hydroxides and alkali metals.

11. The method of claim 1, wherein the porous support material is carbon, magnesium oxide, silica-alumina, magnesium alumina spinel or mixtures thereof.

12. The method of claim 1, wherein the porous support material is removed by pyrolysis or by dissolution in acid.

* * * * *